United States Patent [19]

Laursen

[11] Patent Number: 4,717,287
[45] Date of Patent: Jan. 5, 1988

[54] APPARATUS FOR INSTALLING A FLOWLINE SECTION NEAR THE SEABED

[75] Inventor: Nils K. Laursen, The Hague, Netherlands

[73] Assignee: Shell Oil Company, Houston, Tex.

[21] Appl. No.: 12,093

[22] Filed: Feb. 6, 1987

Related U.S. Application Data

[62] Division of Ser. No. 757,707, Jul. 22, 1985.

[30] Foreign Application Priority Data

Aug. 17, 1984 [NL] Netherlands ............... 8402530

[51] Int. Cl.⁴ .................................................. F16L 1/04
[52] U.S. Cl. ...................................... 405/169; 405/158; 166/341
[58] Field of Search ............... 405/166, 169, 170, 171, 405/158; 166/338, 341, 342, 343, 344

[56] References Cited

U.S. PATENT DOCUMENTS

| | | | |
|---|---|---|---|
| 3,373,807 | 3/1968 | Fischer et al. | 405/169 X |
| 3,466,882 | 9/1969 | Broussard et al. | 405/169 X |
| 3,695,350 | 10/1972 | Petersen | 405/169 |
| 3,729,941 | 5/1973 | Rochelle | 405/169 |
| 3,967,462 | 7/1976 | DeJong | 166/343 X |
| 4,133,182 | 1/1979 | Chateau | 405/169 |
| 4,541,753 | 9/1985 | Langner | 405/166 |
| 4,615,646 | 10/1986 | Langner | 405/169 |
| 4,620,818 | 11/1986 | Langner | 405/169 |

FOREIGN PATENT DOCUMENTS 2110782 6/1983 United Kingdom ............... 405/169

Primary Examiner—Andrew V. Kundrat
Assistant Examiner—Joseph A. Fischetti

[57] ABSTRACT

An apparatus for securing a flowline to a structure near the seabed comprises a vertically oriented guide funnel placed atop a guide tube that is provided with a helical shoulder cooperating with an alignment key mounted on the flowline. During installation the flowline is stabbed into the guide funnel and guide tube thereby causing the alignment key to slide along the shoulder until a pair of hinge pins mounted on the flowline have entered into a pair of slots in the wall of the guide tube. Subsequently the flowline is hinged down to a horizontal position.

2 Claims, 11 Drawing Figures

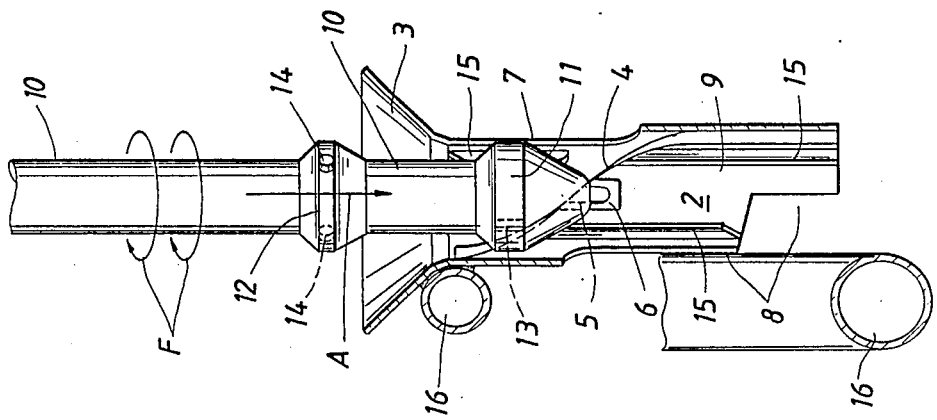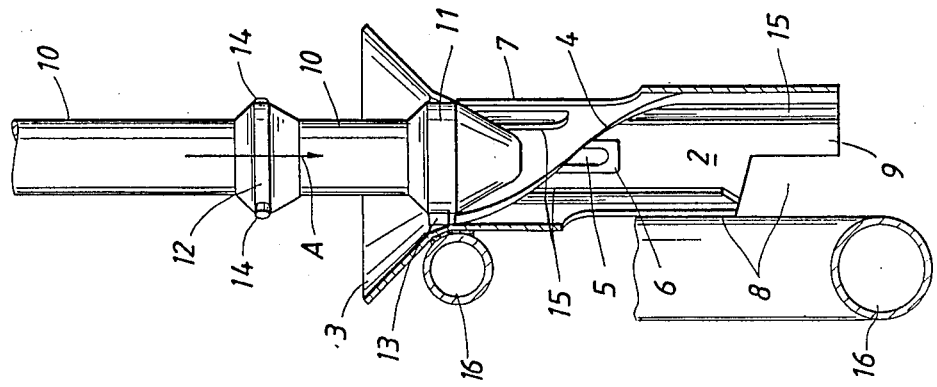

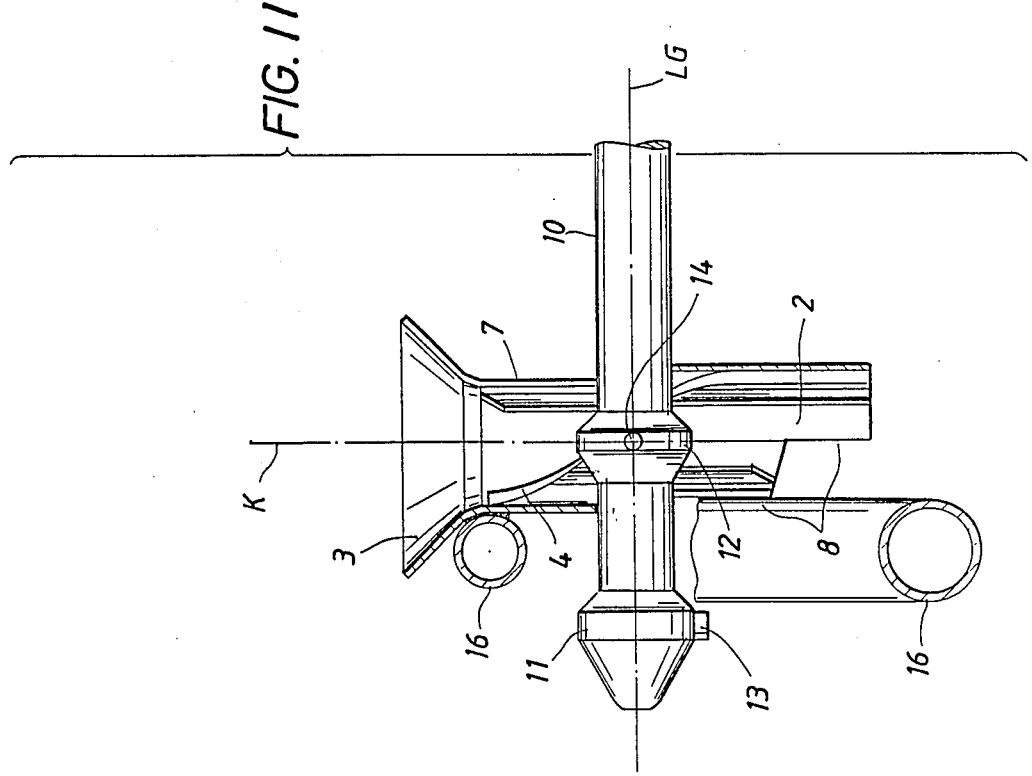
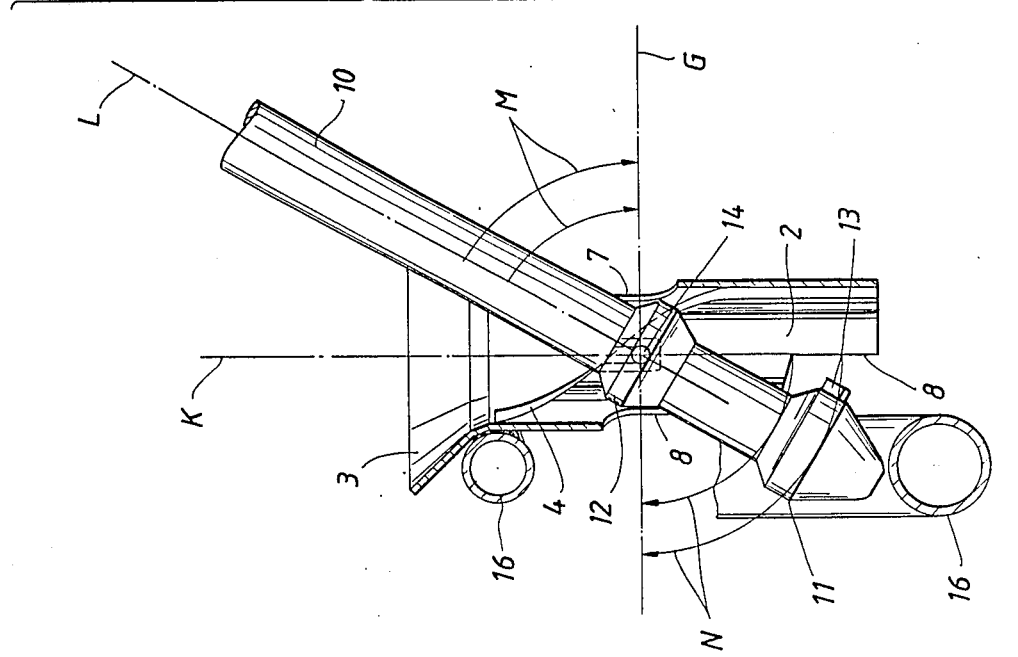

APPARATUS FOR INSTALLING A FLOWLINE SECTION NEAR THE SEABED

This is a division of application Ser. No. 757,707, filed 7/22/85.

BACKGROUND OF THE INVENTION

In offshore oil production, it is common for several oil wells in the seabed to be joined by corresponding flowlines to an oil manifold on the seabed.

This entails the positioning near the oil manifold of flowline sections in a preferably horizontal, or approximately horizontal, position. After the installation in this position, each horizontal flowline section may be connected by flowlines to an oil well on one end and to the oil manifold on the other end.

A problem is that the flowline section is preferably lowered in a vertical orientation from a ship, after which it has to be brought into a properly oriented horizontal or approximately horizontal position.

SUMMARY OF THE INVENTION

The object of the invention is to provide apparatus for receiving, guiding and anchoring a flowline section lowered in a vertical orientation, and for hinging the flowline section from the vertical orientation to a desired final position, preferably a horizontal, or substantially horizontal, final position.

The apparatus according to the invention is thereto characterized in that it comprises a guide tube destined to be erected near the seabed, a guide funnel at one end of the guide tube, a helical shoulder within the guide tube, two opposite slots within the guide tube each leading to a corresponding pivot support, and passages in the wall of the guide tube and in the guide funnel which permit the hinging over of the flowline section. The end portion of the flowline section is designed to cooperate with the guide tube and is provided with a key that can cooperate with a shoulder located within an opening defined down through the guide tube. Two opposite pivots carried by the end of the flowline can each slide in one of the said slots until the respective pivot support has been reached.

These and other features, objects and advantages of the present invention will become apparent from the following detailed description, wherein reference is made to the Figures in the accompanying drawings.

BRIEF DESCRIPTION OF THE DRAWINGS

FIGS. 4, 5, 6, 7, 8, 9, 10 and 11 are schematic representations showing vertical sectional views of the apparatus, the successive figures showing successive steps in the installation of a flowline section.

DESCRIPTION OF THE PREFERRED EMBODIMENT

Figure 3:
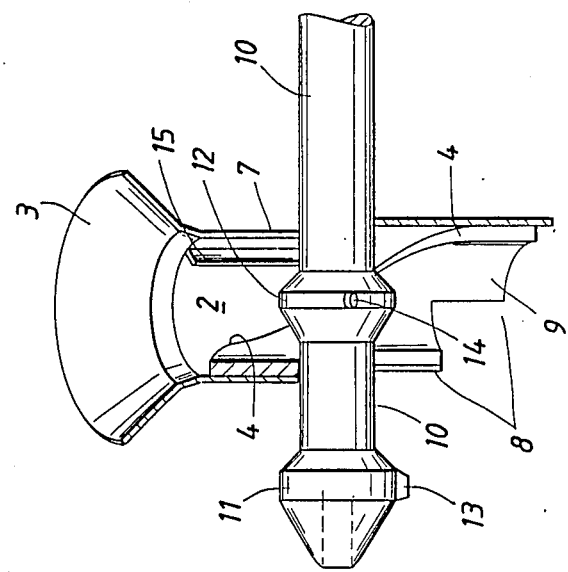
FIGS. 1, 2 and 3 are schematic representations showing vertical sectional views and perspective views of the apparatus. The flowline section to be installed is shown in an initial position, an intermediate position and a final position in FIGS. 1, 2, and 3 respectively.

Referring now to FIGS. 1-10, reference is made to the flowline section 1 to be installed and more specifically to the end portion 10 of the flowline section 1 to be installed. A guide tube 2, provided with a guide funnel 3, is destined to be erected near the seabed (not shown) with its longitudinal axis in a vertical orientation. It is, for example, also possible to secure the guide tube 2 to elements of an oil manifold 16 on the seabed. In practice, a plurality of guide tubes 2 will be secured according to the invention to the oil manifold 16, the number being at least equal to the number of oil wells to be connected to the oil manifold 16.

Within the guide tube 2 is located a helical shoulder 4. Defined within the guide tube 2 are also two opposite slots 5 which both lead to a corresponding pivot support 6. Passages 7 and 8 are present in the sidewall 9 of the guide tube 2. In the prolongation of the passage 7 there is also a passage in the guide funnel 3. The purpose of these passages 7 and 8 and the passage in the guide funnel 3 is to enable the flowline section 1 to hinge, as will be explained below. The end portion 10 of the flowline section 1 is provided with a first collar 11 at the end of the end portion 10 and with a second collar 12 situated at some distance from the first collar 11. The flowline section 1 has a central opening 17 (FIG. 1) defined therethrough as is well known to the art.

The first collar 11 is provided with a radial key 13 which can cooperate with the helical shoulder 4. The second collar 12 is provided with two opposite pivots 14. A plurality of centering ridges 15 are also located in the guide tube 2.

Figure 1:
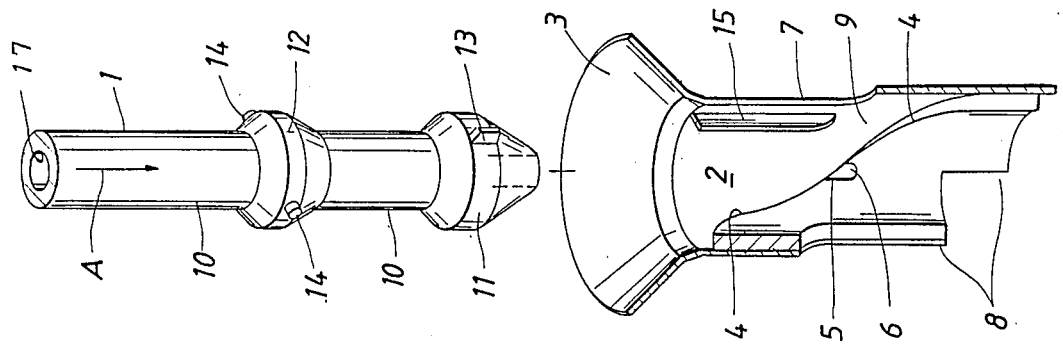
Figure 5:
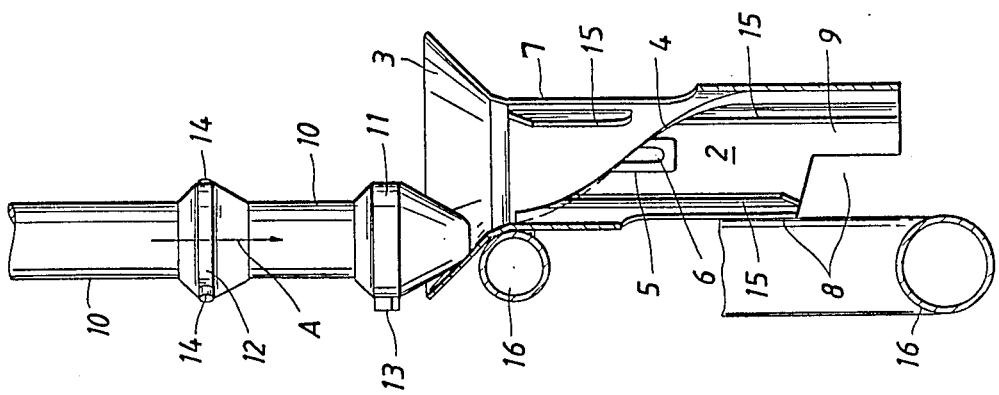
Figure 4:
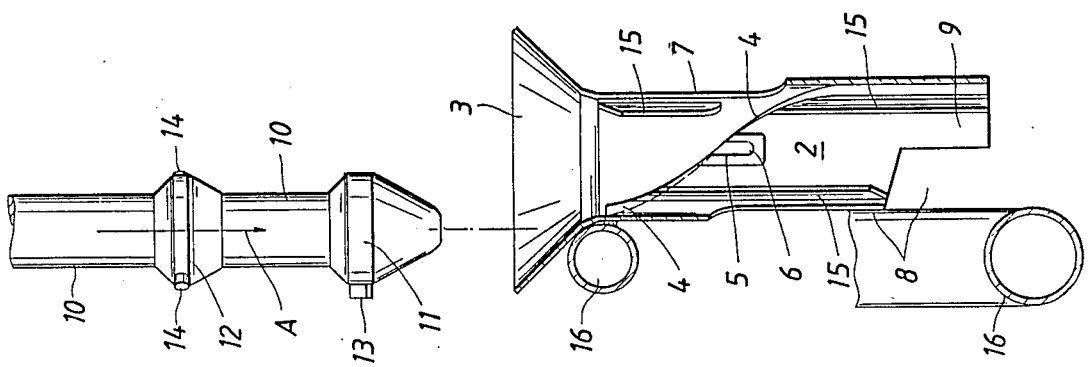
Figure 8:
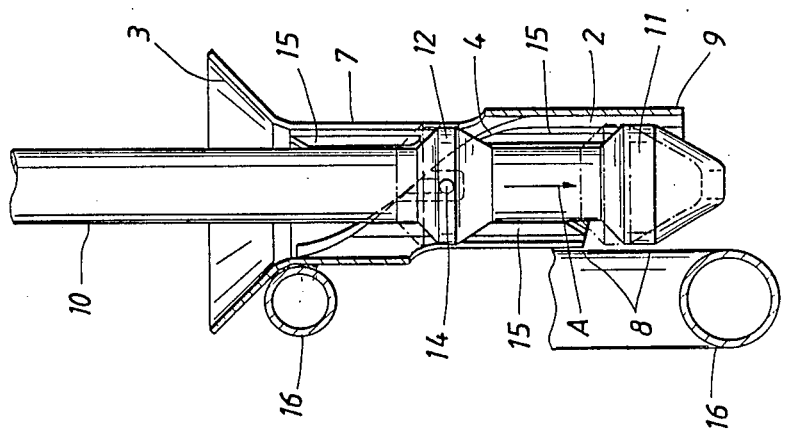

During normal operation of the above-described apparatus according to the invention, the flowline section 1 is lowered in a vertical orientation from a floating vessel (not shown) to the guide tube 2, such that the end portion 10 is received by the guide funnel 3 (see FIGS. 1, 4, 5 and 6). The flowline section 1 with the end portion 10 is therefore lowered in the direction indicated by arrow A (FIG. 1). A key 13 finally contacts the shoulder 4 and is then forced to follow the shoulder 4 as the end section 10 moves further in the direction of arrow A (see FIGS. 7 and 8). This makes the end portion 10 rotate in the sense indicated by the arrows F.

Figure 2:
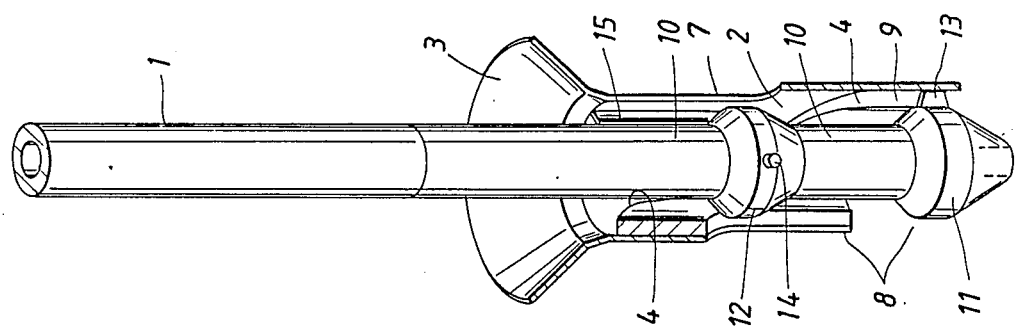
Figure 9:
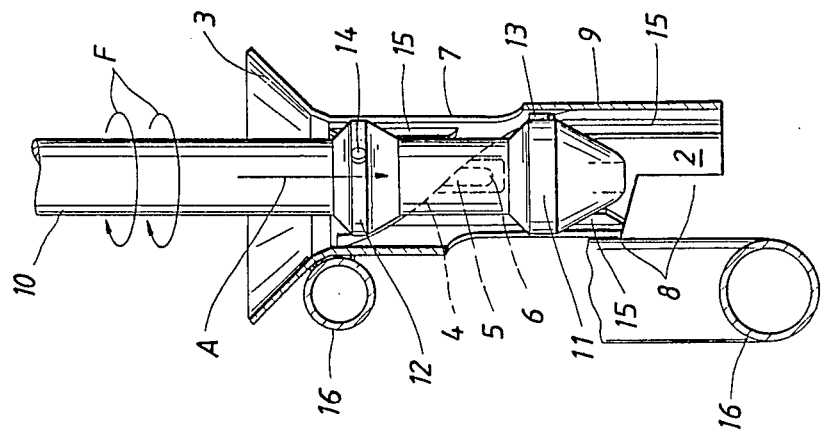

The pivots 14 are positioned relative to the key 13 such that the pivots 14 finally engage in the slots 5 and follow them until they end up resting on the pivot supports 6. The configuration is then as shown in FIGS. 2 and 9 the pivots 14 together with the pivot supports 6 forming a hinge with a horizontal axis that permits the end portion 10 to hinge about the horizontal axis.

Referring to FIGS. 10 and 11, from the position in which the central longitudinal axis L of the end portion 10 coincides with the vertical axis K. the end portion 10 is rotated in the direction indicated by the arrows M and N in FIG. 10. This rotation is continued until the central longitudinal axis L of the end portion 10 coincides with a horizontal line G, as shown in FIG. 11. It should be noted that the final position of the end portion 10, as shown by the line G, does not necessarily have to be horizontal. A slight inclination of the end portion 10 relative to a horizontal plane can sometimes also be desirable. The final position according to FIG. 11 is again shown in perspective in FIG. 3. During the axial movement of the end portion 10 within the guide tube 2, the centering ridges 15 ensure a good centering of the end portion 10 within the guide tube 2.

After the flowline section 1 together with the end portion 10 has reached the final position, as shown in FIGS. 3 and 11, one end of the flowline section 1 can be connected to the oil manifold 16 and the other end of the flowline section 1 can be connected to an oil well in the seabed (not shown).

It should be noted that it is not strictly necessary to employ the apparatus according to the invention together with an oil manifold 16. In general, the apparatus can be employed for any application in which it is desired to lower a pipe section in a vertical orientation from a vessel, after which it is desired to install the pipe section in a horizontal, or slightly inclined, final position on or near the seabed. The apparatus can be employed for the installation both of oil pipes and of gas pipes. The apparatus can also be employed for the installation of other liquid pipes than oil pipes, for example for the installation of water pipes.

Many other variations and modifications may be made in the apparatus and techniques hereinbefore described, both by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

I claim as my invention:

1. An apparatus for receiving, guiding, and anchoring a flowline section adjacent a seabed which forms the bottom of a body of water, said apparatus comprising:

a guide tube having a guide funnel carried at the upper end thereof, said guide tube and guide funnel having a central opening defined downwardly therethrough, said guide tube and guide funnel having passages extending radially outward therethrough from said central opening, said guide tube having a helical shoulder formed within said central opening and slots formed along the sides of said central opening of said guide tube, the lower end of said slots ending in shoulders which form pivot supports; and a flowline section having a central longitudinal axis, one end of said flowline section having a first collar and a second collar situated at some distance from said first collar, said first collar having a radial key extending radially outward therefrom, said key operatively engageable with said helical shoulder, said second collar having two pivots positioned opposite one another and extending radially outward from said second collar, said pivots operatively engageable with said slots formed within the central opening of said guide tube, said pivots carried by said pivot supports which form shoulders located at the ends of said slots, said pivots rotated in said pivot supports to position said flowline section substantially horizontal to said seabed, said flowline section passing through said passages which extend radially outward from said central opening when said flowline section is rotated to a substantially horizontal position.

2. The apparatus of claim 1 wherein a portion of each of said passages extending radially outward from said central opening through said guide tube and said guide funnel are located opposite one another about the circumference of said guide tube, said portions of said passages located opposite one another forming a circular horizontal opening through said guide tube of a diameter greater than the outer diameter of said flowline section.

* * * * *